Oct. 26, 1965   T. A. WYLIE   3,213,531
AXLE HOUSING AND METHOD OF CONSTRUCTION
Filed June 10, 1963   2 Sheets-Sheet 1
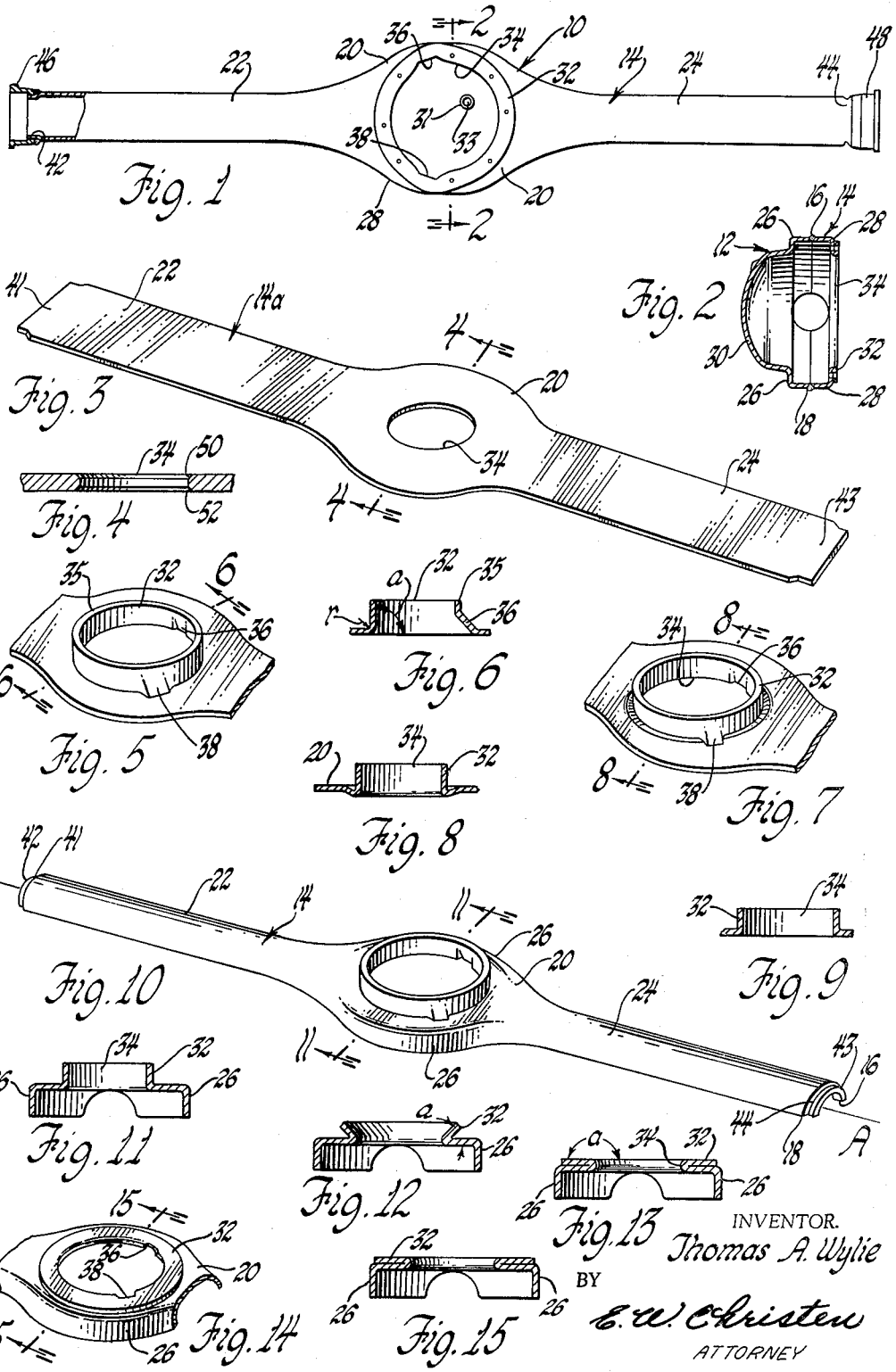
INVENTOR.
Thomas A. Wylie
BY
E. W. Christen
ATTORNEY

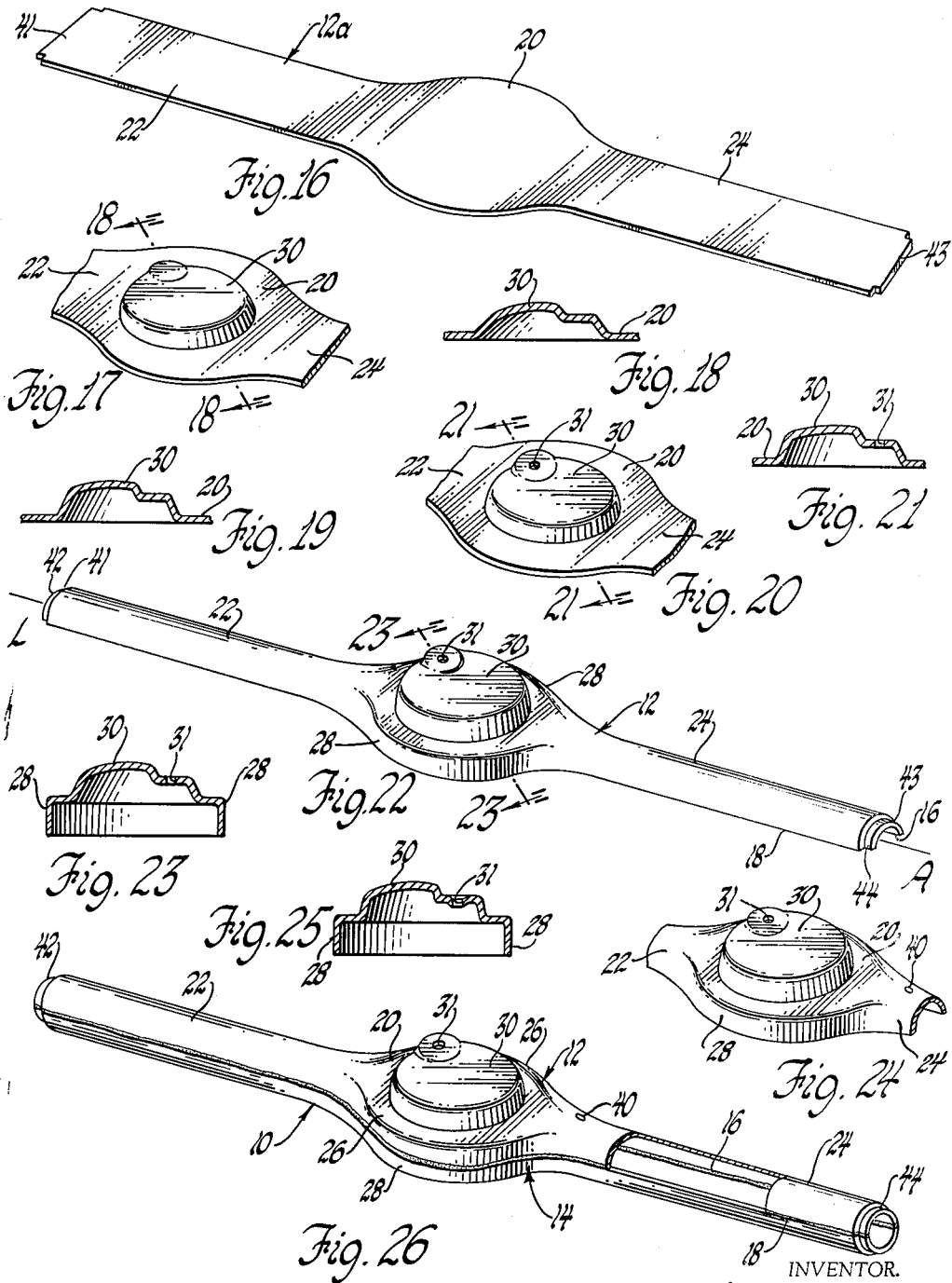

United States Patent Office 3,213,531
Patented Oct. 26, 1965

3,213,531
AXLE HOUSING AND METHOD OF
CONSTRUCTION
Thomas Alva Wylie, Glenelg, South Australia, Australia,
assignor to General Motors Corporation, Detroit,
Mich., a corporation of Delaware
Filed June 10, 1963, Ser. No. 286,657
5 Claims. (Cl. 29—463)

This invention relates to an axle housing for housing a pair of driving axles and a differential carrier arrangement, as well as the method of constructing the housing.

It is relatively conventional for axle housings to be constructed from four components; namely, a differential casing having opposed forward and rear openings, a pair of axle receiving tubes welded to the exterior of the differential casing and protruding from the casing in opposite directions, and a casing cover welded to the differential casing so as to close the rear opening. It is also conventional to machine the exterior surface of the casing around the forward opening for purposes of providing a smooth flat annular flange to which a forward differential casing cover may be mounted. The machined annular flange, having a thickness somewhat less than the differential casing, constitutes a weakened mounting structure.

One known manner of increasing the strength of the annular flange surrounding the forward differential opening is to weld an annular ring to the flange so as to thereby effectively increase its thickness. However, it is apparent that welding an annular ring to the casing adds increased cost in both material and labor. Another known manner of increasing the thickness of the annular flange around the forward differential opening is to provide a continuous annular bend in the flange by bending the flange inwardly of the casing with a bend angle of approximately 180°. However, such an arrangement has a readily apparent defect; namely, by bending the flange inwardly of the casing, an annular pocket is defined within the casing which might trap weld flux splatter and machine shop chips occurring during the construction of the housing.

It is apparent from the above description of prior axle housings that considerable savings may be obtained by the manufacturer if the rear differential cover is formed as an integral part of the differential casing. Also, further savings may be obtained if, instead of axle receiving tubes being welded to the differential casing, such tubes were formed from arms integral with the differential casing.

The axle housing of this invention comprises a pair of complementary channel-shaped stampings formed from flat stock and welded together along their longitudinal edges. A differential opening is defined in an enlarged medial portion of one of the stampings and an outwardly extending cup-shaped wall is formed in a medial portion of the other stamping. A pair of arms extending in opposite directions of each enlarged medial portion of the stampings define, when welded together, a pair of tubular axle receiving members. The medial portions define, when welded together, a differential casing with the cup-shaped wall constituting an integral cover for the differential casing.

In constructing the axle housing of this invention, a pair of flat blanks are first formed from sheet metal stock so that the blanks are of substantially identical size with each having an enlarged medial portion and a pair of arms extending oppositely therefrom. An opening is formed in the medial portion of one blank and a cup-shaped wall is formed in the medial portion of the other blank. The blanks are then bent about their longitudinal axis into channel-shape so that the edges of the blanks define substantially identical outlines. The blanks are then welded together along their longitudinal edges so as to define the structure described above. For purposes of increasing the strength of the differential casing in the area adjacent the opening in one of the blanks, that area may be formed with an outwardly bent annular flange with a bend angle substantially equal to 180°. In this manner, a reinforced annular flange is defined for mounting a forward differential casing cover.

The inventive axle housing and its method of construction result in substantial savings in the cost of manufacture over that known in the prior art. Only two longitudinal welds are required to weld the two channel-shaped stampings together. There is no requirement of welding a separate differential rear cover to the casing, since in the inventive structure, the cover is an integral part of one of the stampings. Furthermore, there is no added cost resulting from welding an annular ring to the housing about the forward differential opening since a reinforced annular flange is provided about the opening. Furthermore, with the outwardly bent annular flange as distinguished from known inwardly bent flanges, no pockets are formed within the differential casing to trap weld flux splatter and machine shop chips, which might occur during the construction of the housing.

A more complete understanding of the invention may be had from the following description taken with the accompanying drawings in which:

FIGURE 1 is an elevational view partly in section illustrating the inventive axial housing;

FIGURE 2 is a sectional view taken along line 2—2 in FIGURE 1;

FIGURE 3 is a perspective view illustrating the forward blank of the invention after having been operated upon as by suitable dies so as to define an enlarged medial portion and a pair of arms extending oppositely therefrom and after an opening has been formed in the medial portion, such as by boring;

FIGURE 4 is a cross-sectional elevational view taken along line 4—4 in FIGURE 3 illustrating the opening in the forward blank after having been chamfered;

FIGURE 5 is a perspective view of the enlarged medial portion of the forward blank after an annular flange has been formed about the opening and after a pair of spaced recesses have been formed in the walls of the flange;

FIGURE 6 is a sectional elevational view taken along line 6—6 in FIGURE 5;

FIGURE 7 is a perspective view illustrating the enlarged medial portion after the annular flange has been set back;

FIGURE 8 is a sectional view taken along line 8—8 in FIGURE 7;

FIGURE 9 is a sectional elevational view similar to that of FIGURE 8 but after the annular flange has been coined;

FIGURE 10 is a perspective view illustrating the forward blank after having been bent about its longitudinal axis LA and after the opposing ends of the arms have been necked;

FIGURE 11 is a sectional elevational view taken along line 11—11 in FIGURE 10;

FIGURE 12 is a sectional elevational view similar to that of FIGURE 11 but after the annular flange has been flared;

FIGURE 13 is a sectional elevational view similar to FIGURE 12 illustrating the enlarged medial portion of the forward blank after the annular flange has been flattened with a bend angle of substantially 180°;

FIGURE 14 is a perspective view illustrating the enlarged medial portion of the forward blank after the medial portion has been coined;

FIGURE 15 is a sectional elevational view taken along line 15—15 in FIGURE 14;

FIGURE 16 is a perspective view illustrating the rear blank after having been operated upon as by suitable dies so as to define an enlarged medial poriton and a pair of arms extending oppositely therefrom;

FIGURE 17 is a perspective view illustrating the enlarged medial portion of the rear blank after a cup-shaped wall has been formed as by suitable dies;

FIGURE 18 is a sectional elevational view taken along line 18—18 in FIGURE 17;

FIGURE 19 is a sectional view similar to FIGURE 18 but after the cup-shaped wall has been re-shaped;

FIGURE 20 is a perspective view illustrating the enlarged medial portion after a filler aperture has been formed in the cup-shaped wall;

FIGURE 21 is a sectional elevational view taken along 21—21 in FIGURE 20;

FIGURE 22 is a perspective view illustrating the rear blank after having been bent about its longitudinal axis LA and after the opposing ends of the arms have been necked;

FIGURE 23 is an elevational sectional view taken along line 23—23 in FIGURE 22;

FIGURE 24 is a perspective view illustrating the enlarged medial portion after a breather aperture has been formed therein;

FIGURE 25 is a sectional view similar to that of FIGURE 23 but after the filler aperture in the cup-shaped wall has been tapped; and FIGURE 26 is a perspective view illustrating the front and rear blanks after having been welded together along their longitudinal edges.

Referring now to the drawings and more particularly FIGURES 1, 2 and 26, there is illustrated an axle housing 10 constructed in accordance with this invention. The housing 10 is formed from a pair of complementary channel-shaped rear and forward stampings 12 and 14, respectively, constructed from flat sheet metal stock which may be relatively low grade hot rolled steel strip.

The terms forward and rear stampings are used here for purposes of respectively designating that portion of an axle housing which faces a vehicle transmission or the like and that portion facing in an opposite direction from the transmission. This is true, for example, with a conventional vehicle having a transmission forward of the axle housing for driving axles. The stampings 12 and 14 are welded together along their longitudinal edges 16 and 18. Each stamipng includes an enlarged medial portion 20 and a pair of arms 22 and 24 of substantially semi-circular cross-section extending in opposite directions from the medial portion. The medial portions 20 of stampings 12 and 14 are bounded by L-shaped arcuate flanges 26 and 28. The legs of the L-shaped flanges 26 and 28 define planes parallel to each other at the center of the housing 10 and taper from the center toward and merge with the walls of the semi-circular arms 22 and 24 of the stampings 12 and 14, respectively. The medial portion 20 of the rear stamping 12 is provided with an outwardly extending cup-shaped wall 30. A circular shaped forward differential opening 34 is defined in the medial portion 20 of the forward stamping 14. An outwardly turned annular flange 32 surrounds the forward differential opening 34. The angle of bend of the flange 32 is substantially 180° so as to render the flange 32 substantially flat. The flange 32 serves to mount a forward differential cover, not shown, to the housing 10. With the turned back flange 32, it is apparent that the thickness of the flange 32 prior to machining, if required, will be twice that of the thickness of the material surrounding the flange. This effectively reinforces the flange 32 to provide a strong mounting for the forward differential cover.

A pair of spaced recesses 36 and 38 are formed in the bend portion of the annular flange 32, as is shown in FIGURE 1. The recesses 36 and 38 serve to provide extra clearance space for a differential carrier drive gear to be contained within the housing 10. This is done since it may be that the diameter of the gear actually used is somewhat larger than originally contemplated.

The cup-shaped wall 30 is provided with a filler aperture 31 and a removable plug 33 therein for purposes of filling the medial portion 20 of the housing with suitable lubricating fluid. A breather baffle aperture 40 is also provided in the rear stamping 12 in the area where the medial portion 20 tapers into the arm 24, as is shown in FIGURE 26. As is conventional in axle housings, a baffle, not shown, may be welded to the inner surface of the arm 24 in the area of the baffle aperture 40.

With reference to FIGURES 1 and 2, it will be observed that the arms 22 and 24 define tubular axle receiving members, the medial portions 20 define a differential casing for housing differential carrier mechanism and the cup-shaped wall 30 constitutes an integral cover for the casing. In constructing the housing 10, the opposing ends of the arms 22 and 24 are respectively provided with annular necked portions 42 and 44. A pair of annular brake mount flanges 46 and 48 are mounted, as by welding, to the outer surface of the necked portions 42 and 44 of the arms 22 and 24.

Having described the structure of the axial housing 10, attention will now be directed toward the method of constructing the housing. The channel-shaped stampings 12 and 14 are formed by first operating upon flat sheet metal stock, such as low grade hot rolled steel strips, with suitable blanking dies or the like to obtain relatively flat rear and forward blanks 12a and 14a, respectively illustrated in FIGURES 16 and 3. The blanks 12a and 14a are of substantially identical size. Each of the blanks 12a and 14a is formed with an enlarged medial portion 20 and a pair of arms 22 and 24 extending in opposite directions from the medial portion. In addition, the blanks are also formed with reduced portions 41 and 43 at opposite ends of the arms 22 and 24.

The channel-shaped stampings 12 and 14 are obtained by separately working and shaping the blanks 12a and 14a, respectively. The method of shaping the forward blank 14a will be described first. Simultaneously with forming the blank 14a into a flat blank similar to that of blank 12a, as shown in FIGURE 16, a differential opening 34 may be formed in the blank 14a, as shown in FIGURE 3, such as with a suitable blanking die. Preferably, however, the differential opening 34 is formed by boring an opening in the medial portion 20 of the blank 14a. Thereafter, opposite wall edges 50 and 52 of the medial portion 20 which define the opening are chamfered to form the structure shown in FIGURE 4. The medial portion 20 of the stamping 14a is then worked upon by a suitable die, such as a flanging die, so as to form an annular outwardly turned flange 32 having a bend angle $a$ of substantially 90°, thereby increasing the diameter of the opening 34. The purpose of boring and chamfering the opening 34 in the forward blank 14a arises since, as discussed hereinafter, the bend angle $a$ of the flange 32 is increased to approximately 180°. Tests on low grade hot rolled steel strip have shown that if the opening 34 is formed with a piercing or punching die, the flange 32 will split at various points about its outer periphery 35 as the flange is bent back with a bend angle approaching 180°. However, by boring and chamfering the opening 34, the flange 32 will not split about its outer periphery 35 as the bend angle approaches 180°, even when relatively low grade hot rolled steel strip is used. Simultaneously with forming the flange 32 or thereafter, if preferred, a pair of spaced recesses 36 and 38 are formed in the bend portion of the flange 32, as shown in FIGURES 5 and 6. The recesses 36 and 38 serve to provide clearance space for a differential carrier driving gear to be contained within the housing 10.

The next step in the inventive method is to reduce the radius $r$, see FIGURE 6, of bend of the annular flange 32. This is necessary because in a later step the bend angle $a$ of the flange 32 is increased to substantially 180° and, as previously mentioned, it is desirable that the forward face of the flange 32 be relatively flat for use as a mounting for a forward differential cover. However, it will be apparent that if the radius $r$ of the bend of flange 32 is not decreased in thickness, it will increase in thickness as the bend angle $a$ is increased. This will result in an other than flat surface defined by the flange 32. Accordingly, in constructing the stamping 14, the flange 32 is set back, such as by suitable dies, to form the configuration shown in FIGURES 7 and 8. Thereafter, the flange 32 and the portion of the blank 20 in the area of the bend of the flange 32 is operated upon with a restricted flow squeezing process, such as with suitable coining dies, to obtain the configuration illustrated in FIGURE 9. It will be observed that the radius $r$ of the bend of flange 32 has now been decreased to a dimension less than the thickness of the blank 14$a$ in the area surrounding the bend portion of the flange 32.

The blank 14$a$ is next bent about its longitudinal axis LA with a suitable die, such as a bending, forming or wiping die, to form the channel-shaped stamping 14 shown in FIGURE 10. During this bending operation, it will be noted that the arms 22 and 24 are formed with substantially semi-circular cross-section throughout their lengths. In addition, the medial portion 20 is provided with a pair of boundary L-shaped arcuate flanges 26. The flanges 26 define planes which are substantially parallel with each other and with the longitudinal axis LA of the stamping 14 at the center of the stamping and which taper from the center toward and merge with the semi-circular walls of the arms 22 and 24. Simultaneously with the bending operation described above or thereafter, if desired, the reduced portions 41 and 43 of stamping 14 are necked, such as with suitable reducing dies, to form necked portions 42 and 44 shown in FIGURE 10.

Next, the channel-shaped stamping 14 is subjected to a restricted flow squeezing operation with suitable coining dies for purposes of coining the longitudinal edges 16 and 18 of the stamping 14 as well as the necked portions 42 and 44. This is done to insure that the edges 16 and 18 and the necked portions 42 and 44 have relatively smooth surfaces for facilitating subsequent welding operations. The next step in constructing the finished channel-shaped forward stamping 14 is to increase the bend angle $a$ of the annular flange 32 to substantially 135°, as shown in FIGURE 12, with suitable dies such as a flaring die. Subsequently, the bend angle $a$ of the flange 32 is increased to substantially 180°, as shown in FIGURE 13, with suitable dies such as a forming die. Thereafter, the medial portion 20 of the stamping 14 is worked upon with a restricted flow squeezing operation, such as with suitable coining dies, to insure that the annular flange 32 is substantially flat, as shown in FIGURES 14 and 15.

Having described the method of constructing the finished forward stamping 14, attention will now be directed toward the method of constructing the finished rear channel-shaped stamping 12. First, an outwardly extending cup-shaped wall 30, as shown in FIGURES 17 and 18, is formed in the medial portion 20 of the flat blank 12$a$. The wall 30 may be formed with a suitable die, such as a drawing die. Preferably, but not necessary to the invention, the cup-shaped wall 30 may be reshaped to the configuration shown in FIGURE 19 by a suitable die, such as a re-drawing or a re-striking die.

Next, a filler aperture 31 is formed in the cup-shaped wall 30 with a suitable die, such as a piercing die, to form the configuration shown in FIGURES 20 and 21. Thereafter, the blank 12$a$ is bent about its longitudinal axis LA to form the channel-shaped stamping 12 illustrated in FIGURE 22. The bending operation may be performed with a suitable die, such as a forming, wiping, or bending die. The arms 22 and 24 are formed with semi-circular cross-sections throughout their lengths. In addition, the medial portion 20 is formed with a pair of boundary L-shaped arcuate flanges 28. The flanges 28 define a pair of planes which, in the center of the stamping 12, are parallel to each other and to the longitudinal axis LA, and taper from the center toward and merge with the semi-circular walls of the arms 22 and 24. Simultaneously with the bending operation described above or thereafter, if desired, the reduced portions 41 and 43 of the stamping 22 are necked with a suitable die, such as reducing die, to form necked portions 42 and 44.

Next, the channel-shaped stamping 12 is subjected to a restricted flow squeezing operation with suitable coining dies for purposes of coining the longitudinal edges 16 and 18 of the stamping 12 as well as the necked portions 42 and 44. This is done to insure that the edges 16 and 18 and the necked portions 42 and 44 have relatively smooth surfaces for facilitating subsequent welding operations.

Thereafter, a breather aperture 40 is provided in the stamping 12 with a suitable die, such as a piercing die, to form the configuration shown in FIGURE 24. The breather aperture 40 and filler aperture 31 are then tapped. A suitable breather baffle, not shown, may be welded to the inner wall of the rear stamping 12 about the breather aperture 40.

The stampings 12 and 14 are then positioned adjacent each other so that their longitudinal edges 16 and 18 are abutting. This is followed by welding the stampings 12 and 14 together along their longitudinal edges 16 and 18 to form the housing 10 shown in FIGURE 26. Annular shaped brake mount flanges 46 and 48, see FIGURE 1, are then respectively welded to the outer surface of the necked portions 42 and 44 of the arms 22 and 24, respectively. If preferred, the brake mount flanges 46 and 48 may be welded to the arms 22 and 24 prior to welding the stampings 12 and 14 together. Thereafter, conventional operations may be performed on the housing 10; namely, adjusting for leaks and repairs, shaving the arms 22 and 24 for U-bolt mounting clearance, welding spring seats and a brakeline clip to the housing 10, inspecting the finished product, and rust prevention.

Although the description of this invention has been given with respect to two particular aspects of the invention, it is not to be construed in a limiting sense. Numerous variations and modifications within the spirit and scope of the invention will now occur to those skilled in the art. For a definition of the invention, reference is made to the appended claims.

I claim:

1. The method of forming an axle housing from sheet metal stock which comprises forming first and second relatively flat blanks of substantially identical size with each having an enlarged medial portion and a pair of arms extending oppositely therefrom, boring a circular opening in the medial portion of the first blank, chamfering opposite wall edges of the first blank which define the opening, forming an outwardly bent annular flange about the opening in the first blank so as to increase the diameter of the opening, increasing the angle of bend of the annular flange to substantially 180°, forming an outwardly extending cup-shaped wall in the medial portion of the second blank, bending each blank about its longitudinal axis so that the arms of the blank are of substantially semi-circular cross-section and that the medial portion of the blank is bounded by a pair of flanges tapering toward and merging with the arms, and welding the blanks together along their longitudinal edges so that the arms define tubular axle receiving members and that the medial portions define a differential casing with the cup-shaped wall of the second blank constituting an integral cover for the differential casing.

2. The method of forming an axle housing from sheet metal stock which comprises forming first and second relatively flat blanks of substantially identical size with each having an enlarged medial portion and a pair of arms extending oppositely therefrom, boring a circular opening in the medial portion of the first blank, chamfering opposite wall edges of the first blank which define the opening, forming an outwardly bent annular flange about the opening in the first blank so as to increase the diameter of the opening, decreasing the radius of the bend portion of the flange to a dimension less than the thickness of material surrounding the bend portion, increasing the angle of bend of the annular flange to substantially 180°, forming an outwardly extending cup-shaped wall in the medial portion of the second blank, bending each blank about its longitudinal axis so that the arms of the blank are of substantially semi-circular cross-section and that the medial portion of the blank is bounded by a pair of flanges tapering toward and merging with the semi-circular arms, and welding the blanks together along their longitudinal edges so that the arms define tubular axle receiving members and that the medial portions define a differential casing with the cup-shaped wall of the second blank constituting an integral cover for the differential casing.

3. The method of forming an axle housing as claimed in claim 2 wherein the radius of the bend portion of the annular flange is decreased by setting back and coining the flange in the area of the bend portion thereof.

4. The method of forming an axle housing from sheet metal stock which comprises forming first and second relatively flat blanks of substantially identical size with each having an enlarged medial portion and a pair of arms extending oppositely therefrom and terminating in reduced end portions, forming a circular opening in the medial portion of the first blank, forming an outwardly bent annular flange with an angle of bend of substantially 180° about the opening in the first blank so as to increase the diameter of the opening, forming an outwardly extending cup-shaped wall in the medial portion of the second blank, bending each blank about its longitudinal axis so that the arms thereof are of substantially semi-circular cross-section and that the medial portion thereof is bounded by a pair of flanges tapering toward and merging with the semi-circular arms, necking the reduced end portions of the arms, welding the blanks together along their longitudinal edges so that the arms define tubular axle receiving members and that the medial portions define a differential casing with the cup-shaped wall of the second blank constituting an integral cover for the differential casing, and welding an annular brake flange to the outer surface of the necked portion of each tubular member.

5. The method of forming an axle housing from sheet metal stock which comprises forming first and second relatively flat blanks of substantially identical size with each having an enlarged medial portion and a pair of arms extending oppositely therefrom, forming a circular opening in the medial portion of the first blank, forming an outwardly bent annular flange with an angle of bend of substantially 180° about the opening in the first blank so as to increase the diameter of the opening, shaping the annular flange so as to define a substantially flat surface by a restricted flow squeezing operation exerted on the medial portion of the first blank in the area thereof including the bend portion of the annular flange, forming a pair of spaced recesses in the bend portion of the annular flange to provide clearance space for a ring gear to be housed by the axle housing, forming an outwardly extending cup-shaped wall in the medial portion of the second blank, bending each blank about its longitudinal axis so that the arms of the blank are of substantially semi-circular cross-section and that the medial portion of the blank is bounded by a pair of flanges tapering toward and merging with the semi-circular arms, and welding the blanks together along their longitudinal edges so that the arms define tubular axle receiving members and that the medial portions define a differential casing with the cup-shaped wall of the second blank constituting an integral cover for the differential casing.

References Cited by the Examiner

UNITED STATES PATENTS

| | | | |
|---|---|---|---|
| 1,243,398 | 10/17 | Fries | 29—477 X |
| 1,295,221 | 2/19 | Simpelaar | 29—463 X |
| 1,621,007 | 3/27 | Ford | 29—471.1 |
| 1,683,047 | 9/28 | Murray et al. | 29—463 |
| 1,991,988 | 2/35 | Spatta | 29—477 |
| 2,153,287 | 4/39 | Wallace et al. | 29—468 |
| 2,377,558 | 6/45 | Johnson | 29—545 X |
| 3,011,466 | 12/61 | Simpelaar | 29—545 X |

FOREIGN PATENTS 789,853  1/58  Great Britain.

BROUGHTON G. DURHAM, *Primary Examiner.*

MILTON KAUFMAN, *Examiner.*